(12) United States Patent
Cowan et al.

(10) Patent No.: US 7,477,206 B2
(45) Date of Patent: Jan. 13, 2009

(54) ENHANCED ZSCREEN MODULATOR TECHNIQUES

(75) Inventors: Matt Cowan, Bloomingdale (CA); Josh Greer, Beverly Hills, CA (US); Lenny Lipton, Los Angeles, CA (US); Joseph Chiu, Pasadena, CA (US)

(73) Assignee: Real D, Beverly Hills, CA (US)

( * ) Notice: Subject to any disclaimer, the term of this patent is extended or adjusted under 35 U.S.C. 154(b) by 69 days.

(21) Appl. No.: 11/430,598

(22) Filed: May 8, 2006

(65) Prior Publication Data

US 2007/0258138 A1 Nov. 8, 2007

Related U.S. Application Data

(60) Provisional application No. 60/742,719, filed on Dec. 6, 2005.

(51) Int. Cl.
*G09G 5/00* (2006.01)

(52) U.S. Cl. ............... 345/6; 348/57; 348/E13.038; 349/25

(58) Field of Classification Search ............ 345/32, 345/87, 88, 204, 94, 6; 349/25, 96, 100; 348/57, E13.038
See application file for complete search history.

(56) References Cited

U.S. PATENT DOCUMENTS

| | | | |
|---|---|---|---|
| 3,575,493 A | 4/1971 | Heilmeier | |
| 3,787,110 A | 1/1974 | Berreman et al. | |
| 3,989,974 A * | 11/1976 | Tottori et al. | 345/76 |
| 4,729,640 A | 3/1988 | Sakata | |
| 4,792,850 A | 12/1988 | Liptoh et al. | |
| 5,398,131 A | 3/1995 | Hall et al. | |
| 6,100,945 A * | 8/2000 | Crandall et al. | 349/25 |
| 6,243,055 B1 * | 6/2001 | Fergason | 345/32 |
| 6,639,743 B2 | 10/2003 | Watanabe | |
| 7,167,309 B2 * | 1/2007 | Saxena et al. | 359/586 |

* cited by examiner

*Primary Examiner*—Kevin M Nguyen
(74) *Attorney, Agent, or Firm*—Smyrski Law Group, A P.C.

(57) ABSTRACT

A method and system for use in conjunction with a push-pull liquid crystal modulator system for creating circularly polarized light of alternating handedness is provided. The method and system comprise a pair of surface mode liquid crystal cells and a driver electrically coupled to the cells. The driver is configured to move an electrical charge using a quenching pulse comprising a relatively brief voltage spike at a beginning of a waveform period. Multiple additional improvements are provided, including reducing the thickness of the LC gap (the distance between cell electrode plates), creating a charge connection or wiring connection to the cell electrodes, employing anti-reflection coating technology, thinner ITO and ITO index matched to the LC material, bonding all possible air to material surfaces, using superior glass, employing more efficient polarizers, and reducing projector blanking time.

25 Claims, 8 Drawing Sheets

ENHANCED ZSCREEN MODULATOR TECHNIQUES

This application claims the benefit of U.S. Provisional Patent Application 60/742,719, entitled "Quenching Pulse Speed Improvement for Push-Pull Modulator," inventors Lenny Lipton and Matt Cowan, filed Dec. 6, 2005, which is incorporated herein by reference.

BACKGROUND OF THE INVENTION

1. Field of the Invention

The present design relates generally to the art of stereoscopic polarizing modulators, and more particularly to improvements to the ZScreen®, a push-pull surface mode liquid crystal modulator having enhanced image clarity, dynamic range, transition time, transmission, and other characteristics.

2. Background of the Invention

The present device is an improved version of the push-pull liquid crystal (LC) modulator described by Lipton et al. in U.S. Pat. No. 4,792,850, issued on Dec. 20, 1988, the entirety of which is incorporated herein. Such a device, commonly called the ZScreen®, has been manufactured by StereoGraphics Corporation, originally as an on-screen modulator used with CRT monitors for the viewing of stereoscopic images. The device developed into a projection selection device, i.e. a device used to select between the left and right images of a stereo pair, for which it is better suited due to certain angle-of-view considerations associated with directly viewing CRT monitors.

Since the device uses two LC cells, the optical path length is long, namely twice the path length of a device using a single LC part. A double path length reduces the device's useful angle of view because the optical path length modulates the dynamic range or extinction characteristics of the sheet polarizer used with the device as a function of angle. Light rays emerging from a projection lens in a projector are of substantially narrower angular range than the angular range required for a user to directly view a CRT monitor. Hence, the push-pull modulator is better suited for the projection environment than direct view.

For a period of about fifteen years the projection ZScreen was used in conjunction with cathode ray tube projectors and later with projectors made by various manufacturers incorporating the digital light projector engine supplied by Texas Instruments. The device has been used for presentations on up to fifteen foot screens in the automotive industry, for oil and gas exploration, and for other kinds of applications that require enhanced visualization or deal with graphics that are difficult to understand without the help of the depth cue of binocular stereopsis.

The ZScreen product gained wide acceptance not only because of the good quality of the image but because it was simple to use only one projector, unlike conventional stereoscopic projection devices.

The image quality requirements were found to be more demanding for the theatrical cinema than for industrial visualization. The product had been employed for years in an industrial environment but when used in a theater on a large screen, shortcomings were evident. The image lacked contrast, the device reduced the sharpness of the content, had insufficient dynamic range for good channel isolation, and a number of other problems had to be addressed in order to create a premium film-going experience for the motion picture audience and content creators. In addition to improvements to the ZScreen, issues with analyzers in the eyewear selection devices needed to be addressed.

The construction of a typical ZScreen device is illustrated in FIG. 1A. The device is made up of a sandwich of linear sheet polarizer 102, an LC surface mode device or SMD (also known as a pi-cell) 103, and another LC cell 104. Although the electro-optical effect described here is independent of the parts being in contact, in this application it is better to have the parts in intimate contact. Laminating the linear sheet polarizer 102, SMD 103, and LC cell 104 together reduces light losses resulting from index of refraction mismatches and increases the dynamic range of the device. The optical components described are coplanar. The linear polarizer 102 has an axis 105, which is given by the double-headed arrow. Similarly, the rub axes of the SMDs have axes described by double-headed arrows, and are orthogonal to each other. The SMD closest to a sheet polarizer is labeled 103 and its axis is axis 106. The second SMD is labeled 104 and its axis is axis 107.

As shown in FIG. 1A, representative light ray 101 first traverses linear polarizer 102, and then SMDs 103 and 104. The electro-optical effect of SMDs 103 and 104 is attributed to their behavior and construction, which requires an input of polarized light. As noted the rub directions of the SMDs 103 and 104 are orthogonal with respect to each other, and SMDs 103 and 104 are bisected by the axis 105 of linear polarizer 102. Therefore, the axis 105 of linear polarizer 102 is at 45 degrees, respectively, to both SMD parts 103 and 104.

Certain issues exist with an implementation such as that shown in FIG. 1A, particularly in the theatrical environment, where extremely high quality projection and viewing requirements exist. Most notably, the previous ZScreen designs when employed in the theatrical environment suffer from inadequate image clarity, low dynamic range, slow transition time, poor transmission characteristics, and other performance issues.

The present design seeks to address the performance of the ZScreen device, and push-pull SMD liquid crystal modulators generally, to increase the enjoyment of perceiving a stereoscopic image in a theatrical environment. It would be advantageous to offer a design that enhances or improves the ZScreen, or push-pull surface mode liquid crystal modulators generally, and in particular a design that offers benefits over those previously available.

SUMMARY OF THE INVENTION

According to a first aspect of the present design, there is provided a push-pull liquid crystal modulator system for creating circularly polarized light of alternating handedness comprising a pair of surface mode liquid crystal cells having orthogonal rub axes, a linear polarizer having an absorption axis bisecting the orthogonal rub axes, and a driver electrically coupled to the cells, and capable of driving the cells so that when one cell in the pair is in a higher voltage state, the other cell in the pair is in a lower voltage state. The system includes an improvement comprising drive circuitry within the driver causing the driver to move an electrical charge using a quenching pulse comprising a relatively brief voltage spike at a beginning of a waveform period.

According to a second aspect of the present design, there is provided a method of displaying a stereoscopic video or digital motion picture image. The method comprises positioning a push-pull liquid crystal modulator that includes a pair of surface mode liquid crystal cells with orthogonal rub axes and a linear polarizer having an absorption axis bisecting the orthogonal rub axes, so that light comprising the image propagates therethrough. The method further comprises driving the modulator in synchronization with fields of a field sequential image so that the transmitted image emerging from the modulator consists of right-handed circularly polarized fields alternating at the field rate with left-handed circularly polarized fields, wherein the driving comprises moving an electrical charge using a waveform comprising at least one quenching pulse comprising a relatively brief voltage spike at a beginning of a waveform period.

These and other advantages of the present invention will become apparent to those skilled in the art from the following detailed description of the invention and the accompanying drawings.

DETAILED DESCRIPTION OF THE INVENTION

An enhanced ZScreen design comprising various improvements and enhancements, useful for theatrical projection, is provided. The improvements and methods used are described below. Taken together, the teachings disclosed combine to form an optically superior device and in deploying these changes a vast improvement can be obtained. This disclosure concentrates on those items that are unique, novel, and not obvious in their execution or application to workers versed in the art.

Operation of the ZScreen Device

Figure 1A:
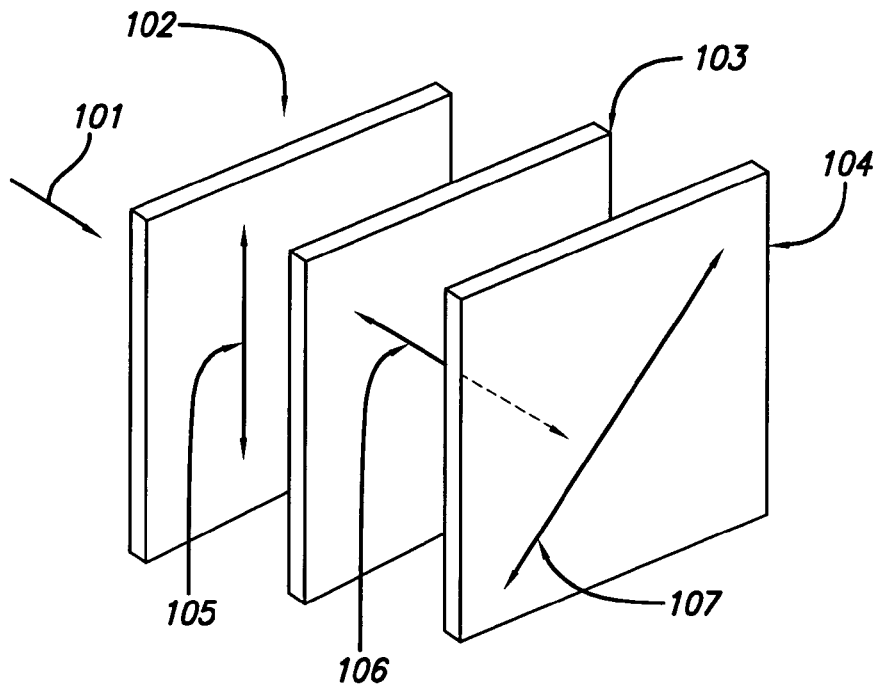
FIG. 1A shows the ensemble of parts that make up a ZScreen push-pull modulator.

The ZScreen device of FIG. 1A shows linear sheet polarizer 102, an LC surface mode device or SMD 103, and another LC cell 104. With regard to FIG. 1A, in the case of polarized light, the behavior of the electric vector of the light waves is considered. The rays emerging from sheet polarizer 102 have their electric vector restricted to a plane that passes through axis 105. Such light is called linearly polarized light. The SMDs subsequently cause phase shifts to the orthogonal components of the linearly polarized light that traverse these components. If the SMD is energized, the SMD is essentially isotropic. When momentarily de-energized, the SMD is a phase shifting part, and this combination of states contributes to the device's functionality.

Figure 4A:
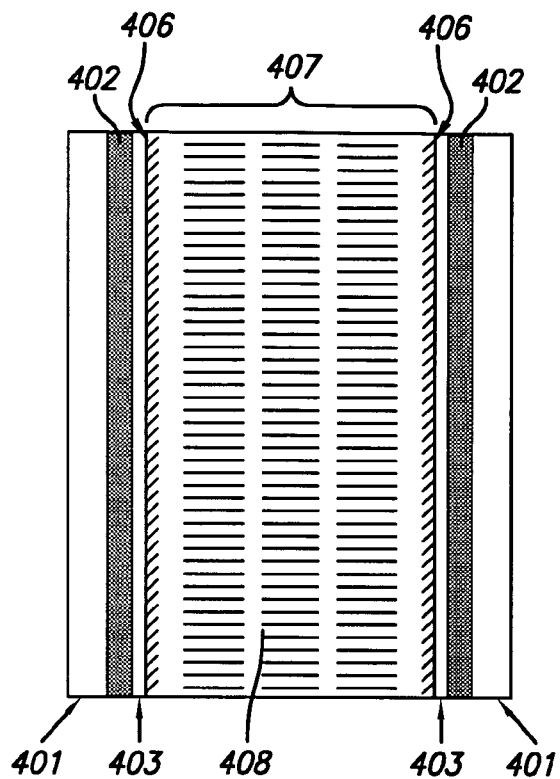
FIGS. 4A and 4B are cross-sectional illustrations of a SMD, showing the internal construction and alignment of directors, given un-energized and energized states respectively.
Figure 4B:
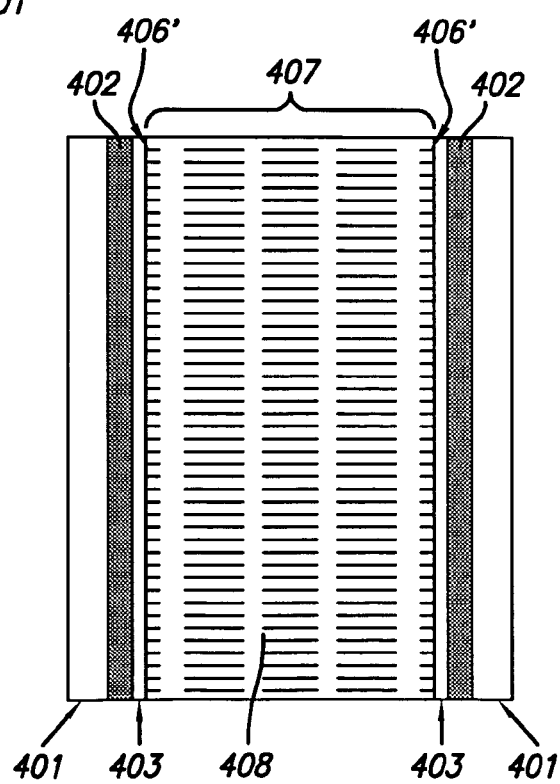

FIGS. 4A and 4B show the construction of the ZScreen which comprises SMDs 103 and 104. SMDs are cells made up of LC (liquid crystal) material 407 (brackets), several microns thick (typically between 3 and 6 microns), enclosed between parallel plates of glass 401. The inward-facing surfaces of the glass are coated with indium tin oxide (ITO) material 402 (cross-hatched), a transparent conductor. Coated on top of the ITO layer is a layer of a polyamide dielectric material 403. The dielectric has imposed thereon a rub direction produced by some type of a buffing wheel. This rub direction produces micro-grooves that suggest an alignment to the directors (dashed or short lines at 406 and 407) that make up the LC material. These are dipole clumps of molecules that provide the crystalline structure of the liquid contained within the region of the region 407 bracketed areas.

In FIGS. 4A and 4B, the director alignment layers 406 are given by diagonal lines at an angle to the surface of the alignment layers 403. The interior directors of the material, given by dashed lines perpendicular to the surface of the cell 408, are called the "bulk." In most common LC devices, the electro-optical effect is attributed to the bulk and the physics of optically activity. In the case of the SMD, the electro-optical effect is provided by the surface layer, or by the directors in close proximity to the director alignment layer, and the physics of the directors may be described in terms of phase shifting.

For the desired SMD electro-optical effect to occur, an LC fluid having the lowest possible birefringence value is employed. The LC fluid has a birefringence in the range of 0.04 to 0.06 and, by way of example, such a material is Merck Catalog no. ZLI-2359 fluid with a birefringence of 0.05 Δn and a positive dielectric anisoptrophy. Such a material is cited by way of example only and the device described is not limited to the use of this material, but any material exhibiting the beneficial functionality described herein may be employed.

As illustrated in FIGS. 4A and 4B, an LC device of this type functions as a capacitor. The system delivers voltage to the opposing ITO (402) layers, creating a potential difference between the layers. With respect to the electronic driving circuit, the push-pull device comprises two capacitors.

The SMD is a three state device. When an SMD is unpowered for a long period of time, the SMD is not in a functional or operational state. The two states of interest are when the SMD is driven to a high voltage and driven or relaxed to a low voltage, or in some cases, a zero voltage. Switching between a low and a high voltage causes the SMD to alternate between phase shifting and essentially non-phase-shifting states.

FIG. 4A shows the directors or alignment layers 406 with low, or possibly no, voltage applied. With no voltage applied, the directors align themselves according to the rub direction of the director alignment layers 406 as shown. In this anisotropic state the device has phase shifting properties. Because the axis of the cell is at 45 degrees to the axis of the linear polarized light, the polarized light's electric vector is resolved into two components at right angles to each other. The components undergo a relative phase shift and this shift, if the proper value, creates circularly polarized light. On the other hand, when applying a relatively high voltage to the part, substantially all of the directors are perpendicular to the surface of the cell, and the device will be in an isotropic state with no phase-shifting properties. In such a case the polarized light is transmitted unaltered.

In FIG. 4B, the result of applying a voltage is shown. As described, the directors are aligned in the direction of the electric field, as shown by 406'. Once voltage is applied to ITO layers 402, an electric field is established between these capacitor plates. The directors, which are dipoles, line up to follow the lines of force of the field. The part is at this point isotropic and has no phase-shifting capability since all of the directors, surface directors 406' and bulk directors 407, are aligned and perpendicular to the plane of the surface of the part. Once the voltage is removed, the surface directors 406' revert, as shown in FIG. 4A at 406, and the part is anisotropic or birefringent and has phase-shifting capability. In other words, the part in this state acts as a retarder. The degree of retardation is determined by the tilt of the surface directors 406, which in turn is determined by the voltage applied.

Figure 2:
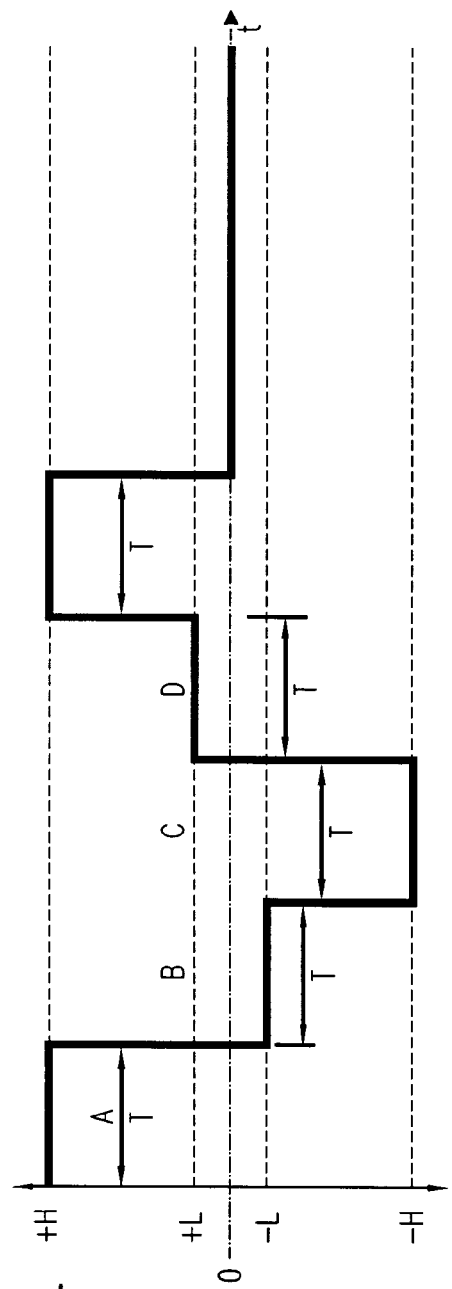
FIG. 2 shows the prior art drive scheme used for powering a ZScreen push-pull modulator.

FIG. 2 illustrates the waveform that has been employed previously for driving the push-pull modulator. Specifically, this waveform is delivered to the indium tin oxide layer of the cells. As noted, the push-pull device is an ensemble made up of a linear sheet polarizer and two SMDs (FIG. 1A), with the SMDs electrically driven out of phase with each other. The waveform presented here is only one-half of the drive scheme, applied to only one of the two cells. When maximum voltage is applied to SMD 103, the minimum voltage is applied to SMD 104. But in both cases the waveform is as shown in FIG. 2.

FIG. 2 shows the time axis labeled "t" with a dotted line, and zero (0) indicates ground or zero-voltage. The voltage (vertical) axis is marked with a double-headed arrow and labeled "V". High and low voltages are labeled H with plus and minus signs and L with plus and minus signs, respectively. The periods in which the voltages are applied are of equal duration and are labeled T, and the drive cycle conceptually occurs in four portions of equal duration labeled A, B, C, and D. Typical voltages for H might be between 10 and 20 volts, favoring the higher values. Beyond a certain value there may be no improvement in electro-optical performance; below a certain value performance deteriorates. The net DC bias is zero. If the average voltage over time is not zero, electrochemical decomposition or plating of the LC cell occurs, and the device performance degrades.

FIG. 2 also shows that the system initially drives one of the two cells to a high voltage H and the high voltage is at +H for the period A, and then decreases to a low voltage –L, typically only a few volts, during period B. During period C the system drives the part to –H, and in period D to a value of +L. The effect of driving in this manner is to deliver a large voltage, then a lower voltage, then a negative-going large voltage, and then a positive-going low voltage. The high voltage is called the drive voltage. The low voltage is called the bias voltage. When the system applies a high voltage to SMD 103 of FIG. 1A, the system applies a low voltage to the other SMD 104. When the system applies a high voltage to SMD 104 it applies a low voltage to SMD 103. The system applies the waveforms shown in FIG. 2 to SMD 103 as shown and a waveform one quarter of a cycle out of phase to SMD 104.

When the system delivers a maximum voltage during period A, the directors 407 are lined up as shown in FIG. 4B. The surface directors are aligned parallel to the directors 407 in the bulk or perpendicular to the plane of the glass surfaces. The device is not phase shifting in this mode. However, some small residual birefringence results since the surface directors 407 may not be perfectly aligned parallel to the bulk directors.

When the minimum voltage in period A as shown in FIG. 2 is at plus or minus L volts, the surface directors 406 are tilted as shown in FIG. 4A. FIG. 4A illustrates the orientation of the surface directors 406 aligned. The driver applies low or bias voltage L to one of cells while the other cell receives the high voltage. The bias voltage L is used to tune the tilt angle of the directors at the director alignment layer 406. By applying the bias, the system can tune the birefringence of the total system and obtain highly precise control over phase shifting. The push-pull modulator can be tuned to output circularly polarized light to an exact wavelength value, as will be described more fully. A properly tuned bias voltage L can be set to compensate for the residual birefringence of the high voltage, H, cell, and in this manner produces circularly polarized light of the correct value.

Figure 1B:
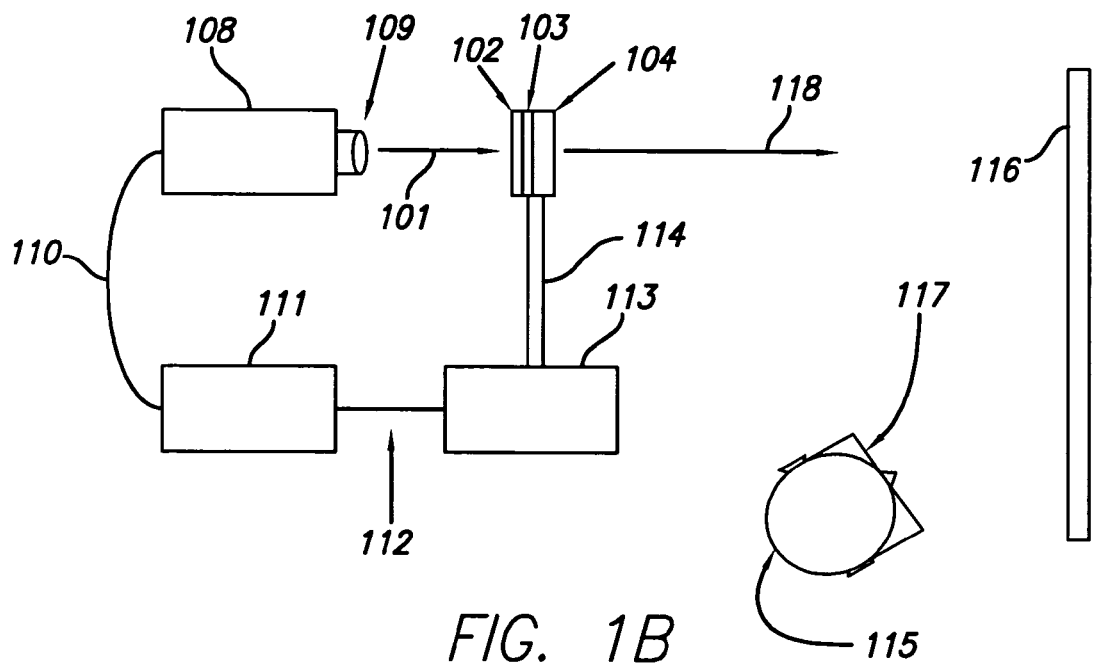
FIG. 1B illustrates the use of the ZScreen push-pull modulator with a projector to produce stereoscopic movies.

With regard to FIGS. 1A and 1B, the projector 108 and projection lens 109 produce unpolarized light 101 that passes through linear polarizer 102 and then through the rest of the SMD ensemble of parts, namely SMDs 103 and 104. At this point linearly polarized light, whose axis is given by line 105, passes through SMD parts 103 and 104. Two operational states are considered here: State 1 and State 2.

In State 1, the driver electrically drives SMD 103 to high voltage H and is isotropic having essentially no phase shifting properties. The unaffected linearly polarized light traversing SMD 103 then enters SMD 104 and undergoes a phase shift since SMD 104 is driven to the low voltage state, plus or minus L volts. If the value of L is properly chosen the result is circularly polarized light of one handedness for a desired wavelength. SMD 104 is adjusted to operate for the desired quarter wave phase shift through the proper selection of voltage L.

In State 2, the driver electrically drives SMD 103 to low voltage L and is anisotropic having phase shifting properties. If the value of L is properly chosen the result is circularly polarized light of one handedness for a desired wavelength. Because the axis of SMD 103 is orthogonal to that of SMD 104, the circularly polarized light produced has opposite handedness to that produced in State 1. SMD 103 is adjusted to operate for the desired quarter wave phase shift through the proper selection of voltage L. The circularly polarized light produced by SMD 103 enters SMD 104 and undergoes little or no phase shift since SMD 104 is driven to the high voltage state, H volts. Since SMD 104 is essentially isotropic, the circularly polarized light emerges unaltered.

The bias voltage tunes the amount of phase shifting of either SMD 103 or SMD 104 for State 1 and State 2, and produces significantly precise $\lambda/4$ retardation. As is understood in the field, chromatic or dispersion effects with retarders and the resulting phase shifting can generally only be optimized for a single wavelength of light—all other wavelengths are elliptically polarized. Since the present design comprises a system with a polarizer and analyzers, as described in FIG. 1B, in combination with selection eyewear 117 used by observer 115, the concern is tuning the birefringence of the parts to match the requirements of the analyzers in eyewear 117. Eyewear in this arrangement comprises lenses made up of left and right-handed circular polarizing filters.

Another reason for applying bias voltage plus or minus L, as shown in portions of the waveform B and D, is to compensate for residual birefringence. One of the characteristics of the SMD is that all of the birefringence may not be eliminated in the isotropic state, and use of two SMDs in conjunction and tuning the birefringence using the bias voltage can eliminate the residual birefringence and produce an isotropic ensemble. Imperfections in retardation result from all directors at the surface layer not obeying the "suggestion" of the rubbed polyamide, or in other words the directors do not follow the direction of rubbing of the rubbed polyamide.

With respect to the operational properties of the modulator, the push-pull modulator may be considered a variable axis toggling retarder. In the physical embodiment, a linear polarizer provides linearly polarized light, and two quarter-wave retarders having orthogonal axes are provided. The linear polarizer can be turned on and off at will. Such an arrangement operates as a single sheet retarder toggled through 90 degrees with no mechanical parts. Excellent, high-purity circularly polarized light of a specific wavelength results from turning on and off the retardation of the SMDs 103 and 104, for light at a given wavelength.

The vector sum of the phase shifts of the two parts is controlled by the voltages applied by the system to the parts. The resultant phase shift is a vector sum of the electric vectors of the electromagnetic waves, in mutually orthogonal planes, that produce plus or minus quarter-wave retardation. This embodiment is superior to rotating a retarder through 90 degrees because the user or operator can precisely tune the birefringence to match the characteristics of the analyzers. Such precise tuning is difficult to achieve with conventional sheet retarders.

Those skilled in the art will recognize that a circular polarizer uses a retarder component that can have only one value of retardation, and the ZScreen is a device of this type. Certain achromatic polarizer devices can be optimized for a broader band of the visible spectrum, but the ZScreen is of the non-achromatic type. For any non-achromatic circular polarizer the analyzer (eyewear) retarder components are selected to match the wavelength of the circular polarizer(s). The retardation component(s) of the circular polarizer(s) and the circular analyzer(s) having the same value of retardation yield a maximum dynamic range. Extinction exists on either side of the value of quarter-wave retardation because the ellipticity of the polarizer(s) and analyzer(s) match one another since they use the same value for retardation and behave identically in this respect. So in effect, the circular polarization system is also an elliptical system on either side of the quarter lambda (wavelength) selected. As used herein, the term "circular polarization system" or "circular polarization" refers to both circular and elliptical systems, and the term "elliptical" when used herein encompasses both ellipse form and circular form. In sum, the ZScreen and eyewear analyzers form a system that has maximum dynamic range at one wavelength but analysis continues to take place for light on either side of the selected wavelength. Were this not the case, the device would exhibit a great deal of cross talk.

With reference to FIG. 1B, the push-pull modulator (102, 103, 104) is shown as described in FIG. 1A and may be used to project a motion picture or video image. The projector 108 provides the image, where lens 109 is the projector's lens, by delivering the video signal to the projector 110 by video source 111. Video source 111 also provides synchronization signal 112 to the electronic drive box 113 that provides the voltages shown in FIG. 3. The synchronization signal can be received from projector 110 but sometimes originates from video on a server or similar device. The system applies voltages (FIG. 2) to the push-pull modulator by cables or wires 114. The unpolarized light 101 is subjected to polarization by linear polarizer 102. The system then subjects the resultant light to the phase changes and thus the production of alternately left- and right-handed circularly polarized light by SMDs 103 and 104 as described herein.

Arrow 118 shows rays of circularly polarized light. The projected light reflects off of polarization-conserving screen 116, and may be observed by an observer 115 wearing analyzing spectacles 117. The spectacles 117 typically include left- and right-handed circular polarizers, one covering one eye and one covering the other eye.

The system delivers video fields or motion picture frames of alternating left and right perspective to projector 108, projected by lens 109, in the form of unpolarized light 101. Light then traverses the push-pull modulator. The left and right perspective fields are polarized with alternately produced left and right (or right and left) handed circularly polarized light. Alternating the fields at a sufficiently rapid rate produces a generally flicker free stereoscopic effect for the observer 115. The system projects a train of circularly polarized light fields whose characteristics are of alternate handedness—one field having one handedness, such as right handed, the next field having the other handedness, such as left handed. These fields reflect off of screen 116.

The result is that the observer 115 wearing analyzing spectacles 117 sees a stereoscopic image. The image is presented to observer 115 in the field-sequential mode, and the required polarization characteristics are imposed on the light by the push-pull modulator.

Circularly polarized light in a projection system is superior to conventional linearly polarized light because it allows for head tipping. Although chromatic shifts and a reduction in dynamic range occur when the user or observer tips his or her head when watching a three-dimensional movie using circularly polarized light for image selection, the result is superior to that when viewing a linearly polarized movie. Even large angular head tipping using the design described here does not result in crosstalk. Crosstalk looks to the viewer like a double exposure. Because one uses circularly polarized light, with head tipping, there are relatively minor chromatic and extinction changes. On the other hand, when the system uses linearly polarized light, as is commonly the case, the law of Malus applies. The law of Malus relates the intensity I of linearly polarized light transmitted by a linear polarizer to the intensity $I_0$ of the incident linear polarized light, and the angle B between the plane of the axis of incident polarized light and the plane of the axis of the analyzer, by the expression:

$$I = I_0 \cos^2 B \qquad (1)$$

A small change in the angle B results in a large change in transmission. Accordingly, only a little head-tipping leads to the perception of a double image when viewing through linear polarizing spectacles. The present design can eliminate crosstalk between the left and right images by optimizing the performance of the push-pull modulator. Transitions between polarization states must be relatively rapid using the present design since any dwelling of one polarization state within an unwanted perspective field contributes to crosstalk.

In designing a stereoscopic motion picture projection system, the designer accounts for every optical element from the projector to the eyes of the beholder. Issues exist with respect to the projector, projector colorimetry, projector total luminous flux, projector polarization state, and the manner in which fields are sequenced. The ZScreen is a critical item in the system but ZScreen performance cannot be optimized without addressing performance characteristics of the rest of the system, such as projection port glass composition, the projection screen, and the eyewear. The port glass is preferably not birefringent, but must have high transmission, and generally must not color shift the light. The screen preferably has good gain, does not produce color shifts, has even illumination and conserves polarization. The eyewear circular polarization retarders must generally match their retarder elements and the retardation value set for the ZScreen. Every portion of the system is preferably controlled, via altering design parameters, to optimize the stereoscopic effect.

Improvements to the ZScreen Device

In addition to the drive scheme discussed with reference to FIG. 2, moving charge faster may be accomplished by switching speed improvements such as changing the LC material, reducing the thickness of the LC gap (the distance between cell electrode plates), and creating a charge connection or wiring connection to the cell electrodes.

Superior anti-reflection coating technology, thinner ITO and ITO index matched to the LC material, bonding all possible air to material surfaces, using superior glass, employing more efficient polarizers, and reducing projector blanking time may all enhance overall performance and the viewing experience. Additionally, the system may exhibit improved extinction ratios for superior left and right channel isolation by improving the LC formulation, matching the retardation characteristics of the eyewear analyzers to the ZScreen, providing superior AR coatings, and enhanced bonding components.

Other improvements to the system include enhancements to the thermal management system, since polarizers fade with exposure to flux, using fade resistance polarizers, increasing the size of area of the parts, and adding a cooling fan. Improvements have been made to color management by exploiting the spectral characteristics of the modulator.

Finally, better extinction or channel isolation and color neutrality may be exhibited by improving light transmission, linear polarizer optical quality, and determining the characteristics of the retarder film component of the analyzers in order to match the eyewear analyzers and the ZScreen polarizer.

Drive Scheme Enhancement

The first improvement is the drive scheme used to move the charge. The device seeks to improve the speed or response time of the push-pull modulator by using a "quenching pulse" shown in FIG. 3 at E'. Comparing FIG. 3 with FIG. 2 shows that the only material difference is the addition of this lower voltage "spike" or quenching pulse added to the low voltage or bias section of the waveform at B and D, or in FIG. 3 at B' and D'. The brief downward section of the waveform is responsible for the speed improvement disclosed and employed herein.

Switching speed is controlled by two factors. The first is the ability of the LC directors, as described above and depicted in FIGS. 3, 4A, and 4B, to physically move into position to provide the desired retardation. Moving the LC directors into position is driven by the electric field provided to the ITO electrodes. The second factor is the time required to create the electric field. The LC cell has an inherent capacitance proportional to the area of the cell, the dielectric constant of the LC material, and inversely proportional to the cell spacing. In the case of the SMDs used for the push-pull application, the capacitance can be relatively large—on the order of tenths of a microfarad or greater. Added to this capacitance is the resistivity of the ITO that carries the charge to make the electric field. Higher resistivity ITO is thinner but gives better cell performance insofar as transmission is concerned, but a reduction in thickness creates series impedance in the charging of the LC cell, and the series resistance controls charging.

The system requires a total charge Q to change the electric field from the off state to the on state. Q is defined by:

$$Q = C\Delta V \quad (2)$$

where Q is total charge in coulombs, C is the capacitance in farads, and $\Delta V$ is the change in voltage. Charge movement is impeded by the series resistance of the ITO, creating a time constant. Further limiting the charging time are the limitations on output current from the electronic module 113 that powers the push-pull device.

Figure 3:
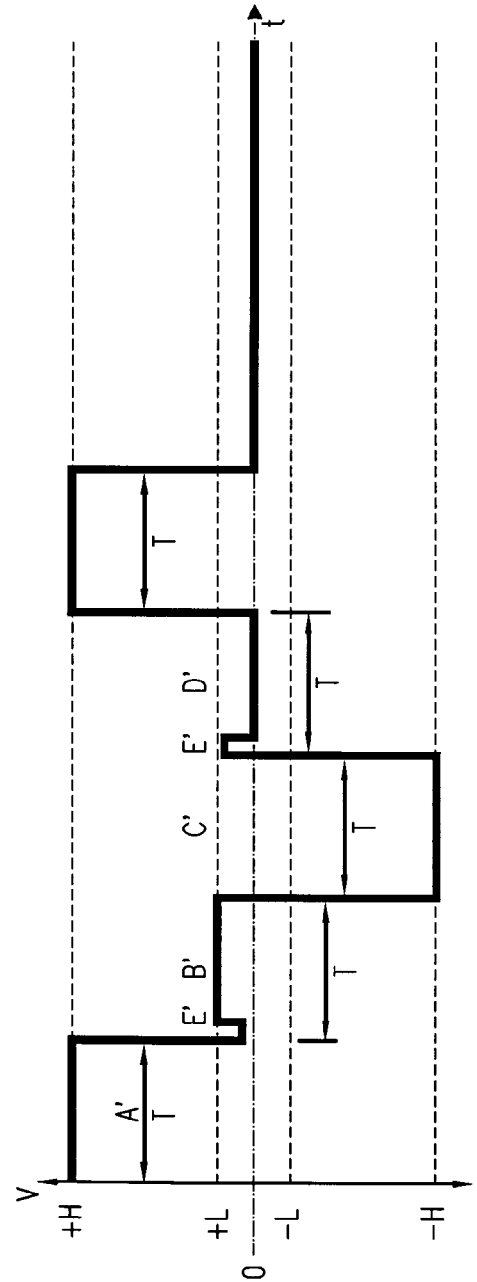
FIG. 3 shows the improved drive scheme employed in the present device.

To minimize the time required to charge the LC cell, the system may apply a larger differential voltage to the cell for a relatively short period of time, as shown in FIG. 3 at E'. Application of a larger differential voltage maximizes the rate of charge transfer. When sufficient charge has been transferred to achieve the required bias voltage applied to the cell, the system increases the drive voltage to the bias level sufficient to induce the correct level of birefringence.

Figure 6:
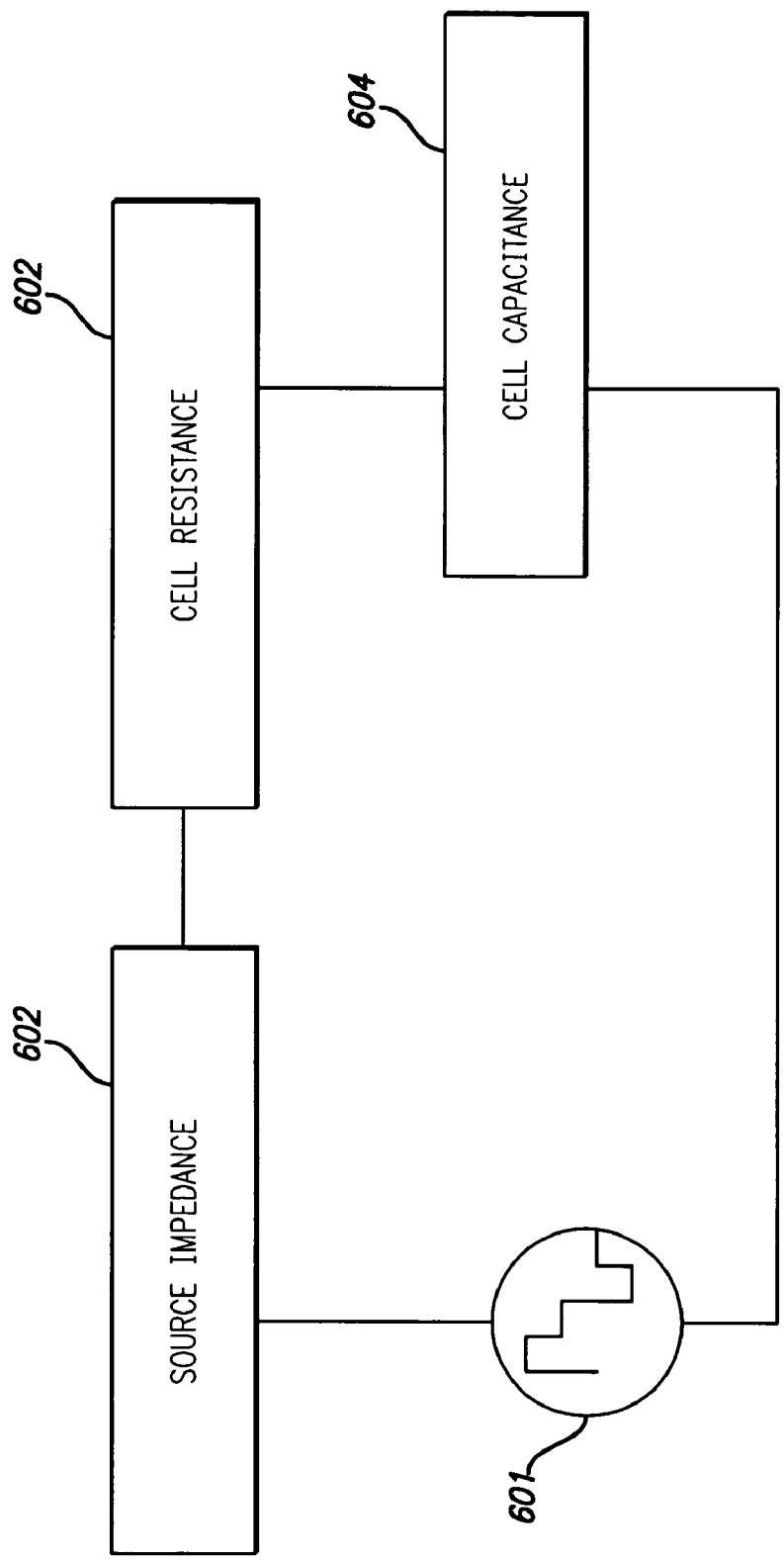
FIG. 6 illustrates the electrical equivalent circuit, showing the elements that affect the rate of charging or discharging the electric field on the LC.

FIG. 6 shows the equivalent circuit of the drive module and the LC cell. In this circuit, the cell is represented by cell capacitance 604 and the series resistance 603. This circuit is charged by the drive waveform 601 in series with the source impedance of the drive module. The circuit allows the charging performance of the liquid crystal cell to be modeled and the electric field across the LC material to be predicted. Thus a drive waveform with a quenching pulse more rapidly creates the electric field necessary to achieve the required switching of the LC.

Figure 5:
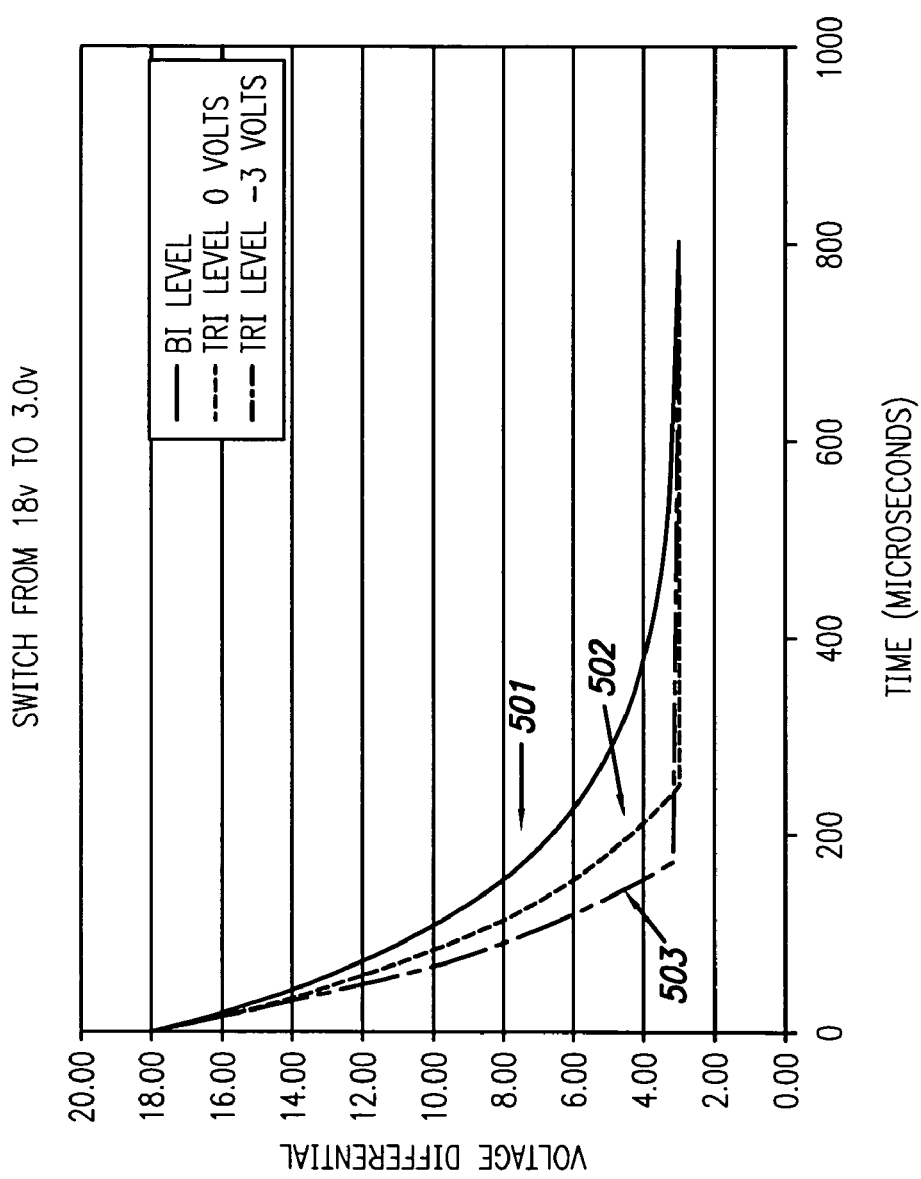
FIG. 5 illustrates the charging waveform for the cell, showing the speed improvement from applying an overshoot or quenching pulse on the charging waveform.

FIG. 5 shows the charging waveforms (voltage) for a cell of approximately 250 square centimeters, and compares the waveforms of the electric field at the cell with no quenching pulse, a pulse of 3 volts of overshoot, and a stronger pulse of 6 volts of overshoot. The three conditions are modeled in FIG. 5. The first condition is the electric field across the liquid crystal under normal two level charging as shown at graph 501. The time to achieve the desired electric field is many hundreds of microseconds. The second case at graph 502 shows 3 volts of overshoot. Three volts of overshoot brings the electric field to equilibrium more quickly, on the order of 250 microseconds. Using a more extreme overshoot, as shown in graph 503, the electric field attains equilibrium more quickly, in about 175 microseconds.

Performance may be improved since charge is moved faster by the quenching pulse creating a larger $\Delta V$, thus creating a larger charging current. The larger charging current reduces the time necessary to move the total amount of charge (Q) to create the required steady-state electric field to hold the LC molecules in the correct orientation to achieve the required birefringence.

The quenching pulse is illustrated in FIG. 3 as E'. The quenching pulse approaches ground or zero voltage, is applied for a short period of time as shown in FIG. 3. When the system applies a pulse of this nature, performance improvements may be realized, such as halving the transition time. One can get more light on the screen and less crosstalk or the leakage of one perspective view into the other, a phenomenon that is perceptually disturbing. The push-pull modulator is used with, typically but not exclusively, a DLP (digital light projector). A DLP© using DMD© (digital micro-mechanical mirror modulator) chips manufactured by Texas Instruments is embodied in projectors by Christie, NEC, and Barco, for example. In this disclosure the use of a DLP projector is assumed but it will be obvious to one of ordinary skill in the art that the design taught here is independent of such a construction and other devices may be employed with similar results. As used herein, the term "electronic projector" is employed to mean any type of such device with a high field rate, including but not limited to a digital light projector or other appropriate light engine.

Because of the nature of the DLP's micro-mechanical mirror modulation, the system may achieve a shorter or even nonexistent blanking period. The blanking period is the housekeeping period used in video signals, and its historical antecedent was the blanking requirement dictated by the fact that an electron beam must have time to be steered between fields. Today, for the DLP projection system, no such housekeeping is required. Therefore a blanking period is enforced to ensure compatibility of a stereoscopic system requiring modulator transition time with equipment that requires a blanking period. A short transition time provides a bright motion picture image, since the modulation transition required for changing the states of polarization reduces projected light output. Moreover, the greatest separation of perspective images that can be achieved is also desirable. When displayed, the left image remains in one channel the right image in the other. Since this multiplexing occurs in the time domain, a rapid transition of the changing polarization characteristics promotes channel isolation.

Significant light losses may be suffered in the projection of stereopair images. Not only do the polarizers employed reduce the light, but also the duty cycle reduces the light further since each eye is only seeing half the available light (minus the switching time). Improving the transition time of the SMD modulator significantly enhances overall performance. The switching time duty cycle increases the amount of time that the image is black or blanked. A stereoscopic moving image is repeated at some multiple of the capture rate. If, for example, the system captures an image at 30 fields per second (video or computer rate) then the image is displayed twice and "interleaved" with the other perspective image for a total repetition rate of 120 fields per second (fps). If capture is at the film standard of 24 fps, the repetition rate may increase by a factor of three, or in this case, to a total of 144 fps (24 for one eye, 24 for the other, each image repeated and interleaved three times). All of this switching between fields of the other perspective requires additional push-pull modulator transitions that can exacerbate the loss of light inherent in this image selection scheme. Therefore performance is enhanced by reducing the duration of the blanking or transition time since each transition robs required light for reaching the screen and the eyes of the audience members.

Configuration Changes—LC Material and Connection

Adjustments to the LC material and thickness of the LC gap can have beneficial effects. To increase the switching speed of the device, the gap in the LC cell is decreased, resulting in a thinner layer of LC material. A thinner LC provides faster switching times.

Changing the connection geometry can reduce series resistance and improve the speed of the parts. The equivalent circuit of the cell shows the cell as a capacitor 604 with a series impedance 603. The series impedance 603 is made up of the sheet resistivity of the conductive ITO material. As discussed earlier, the time constant of the cell dictates the length of time required to charge the cell to the sustaining voltage necessary to switch the LC material.

The series resistance in the equivalent circuit of the sheet resistance of the ITO conductive coating is directly proportional to its geometry. The series resistance increases if the sheet is longer than it is wide, and reduces if it is wider than it is long. In this situation, connections are made on the "width" side.

The cell geometry previously employed was square, with electrical connections to the cell along one edge. A square cell geometry results in a series impedance of typically 100 ohms (for 100 ohm per square ITO). The value of this impedance is a significant factor in charging the cell to the equilibrated electric field necessary for adequate operation.

Figures 1, 7A:
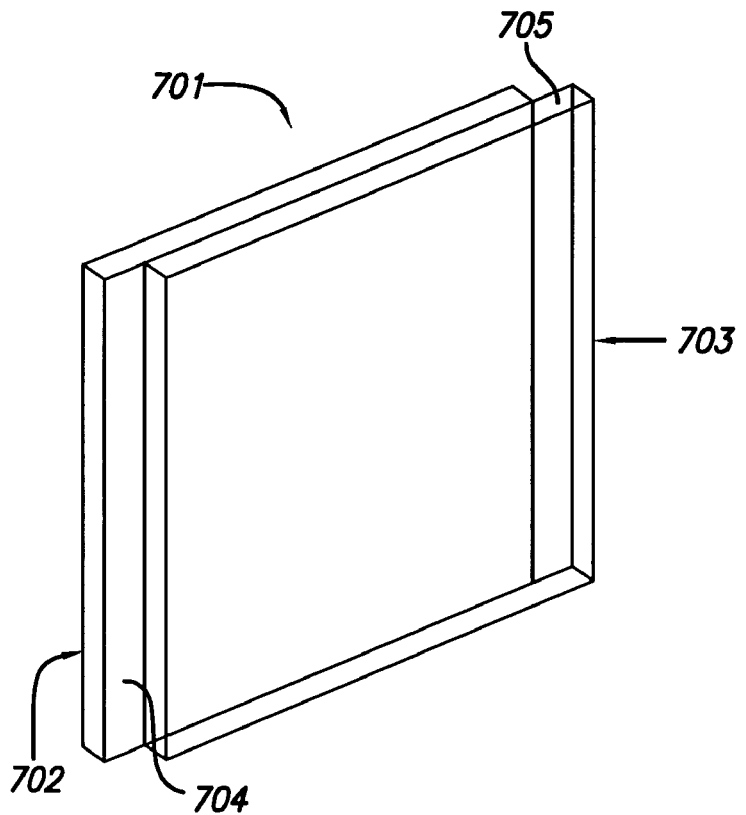
FIGS. 7A, 7B, and 7C illustrate the construction of the SMD cells in the push-pull configuration with particular attention paid to the electrode structure of the devices, where left views are perspective views delineating the construction of the push-pull devices and adjacent right views are cross-sectional.
Figures 2, 7A:
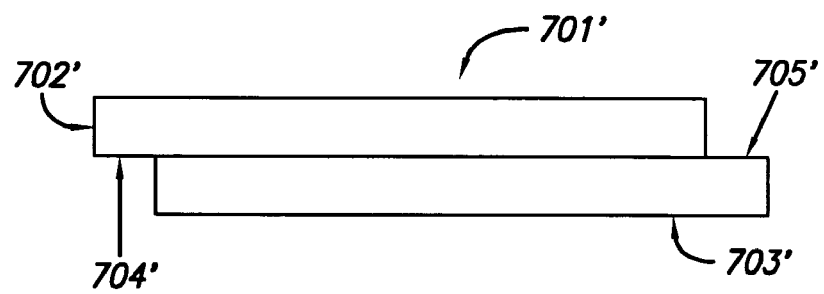
Figures 1, 7B:
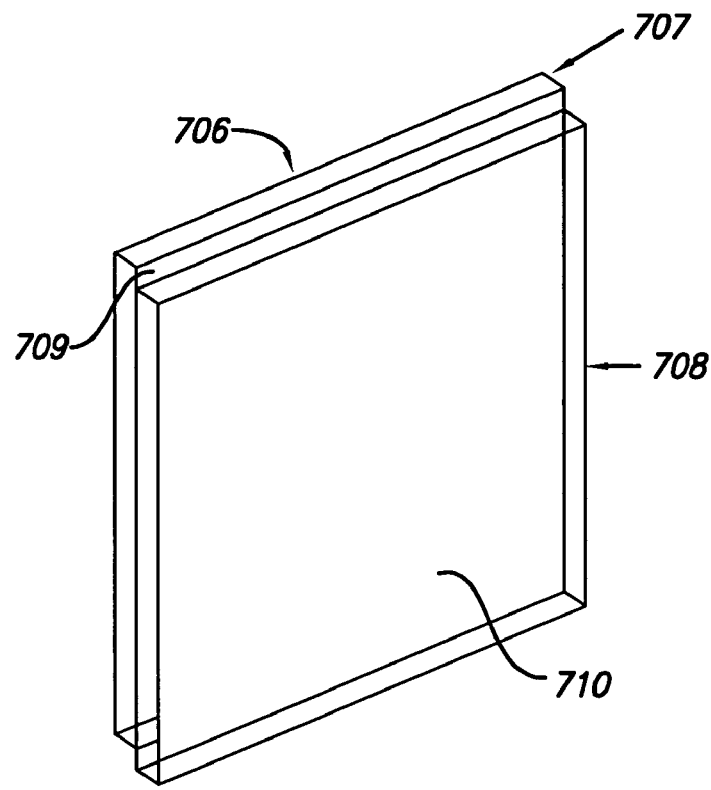
Figures 2, 7B:
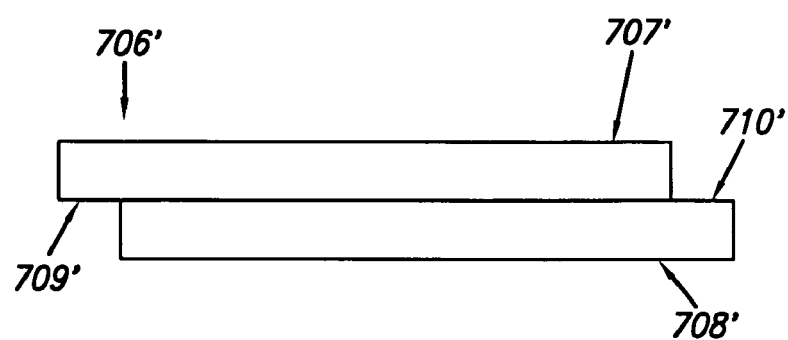
Figures 1, 7C:
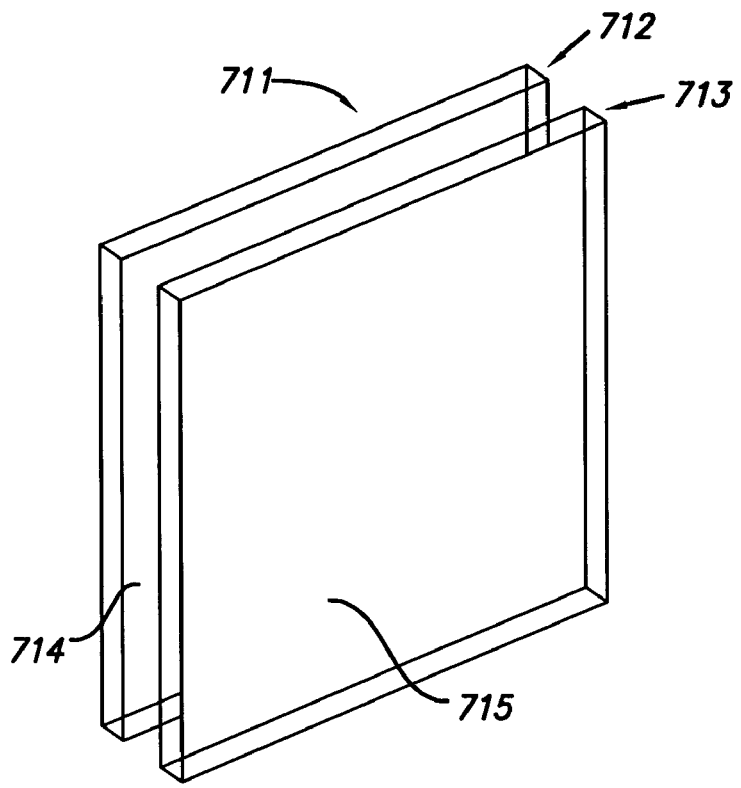
Figures 2, 7C:
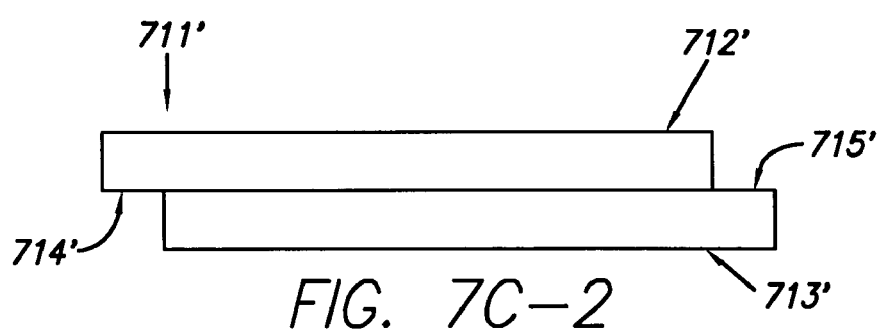
Figures 3, 7C:

FIGS. 7A through 7C give possible configurations of push-pull design. The three basic designs are shown in both perspective and cross-sectional views. The design illustrated in 7B is more sophisticated than that of FIG. 7A, and FIG. 7C illustrates a highly efficient approach. The present design is a basic geometry in which the push-pull device is rectangular and designed to have an aspect ratio designed to match the shape of the beam leaving the projector, thereby minimizing area and reducing manufacturing cost. For 100 ohm per square ITO coating, and for example a cell with an aspect ratio of 2:1 (twice as wide as it is high) the cell impedance doubles to 200 ohms if the electrical connections are along the short side, and halves to 50 ohms if they are along the long side.

Having discussed the properties of the constituent SMD LC cell of the present design, attention will now be given to the push-pull ensemble of two such parts configured to optimize performance.

These teachings use various electrode designs and connection approaches as given in FIGS. 7A through 7C. The cell impedance can be equivalently modeled as a capacitor with a series resistor. The liquid crystal is a dielectric separator between the separated plates of the SMD, while the resistance of the ITO provides the series resistance. The resistance (R) portion of the cell impedance can be approximated as a single resistor, or in other words the capacitor may be ignored:

$$R=Rs*L/W \qquad (3)$$

where Rs is the sheet resistance value for the ITO, and L and W are the width and length of the ITO square. Length is the dimension between the two terminals of the cell. The SMD cell is X inches wide and Y inches tall. In most cases, the cell is wider than it is tall—that is, X is greater than Y.

FIG. 7A shows the currently manufactured push-pull device with a perspective view of the assembly to the left and the cross-sectional TOP VIEW, so labeled, to the right. In this design the terminals to apply the SMD drive voltage are located on opposite ends of the SMD along the narrower edges. In this configuration, $$Ra=Rs*L/W=Rs*X/Y \qquad (4)$$

where Ra is the resistance of the new configuration (FIG. 7A) and X is greater than Y, and X/Y is always greater than 1. The push-pull ensemble 701 is shown with back SMD part 702 and front SMD part 703. The exposed ITO electrode surface 704 of back SMD part 702, and the exposed electrode surface 705 of front SMD part 703 faces away from the reader. In the TOP VIEW drawing of FIG. 7A the corresponding parts are identified with a prime, such as 701' corresponding to 701. In this configuration electrical connections are made to surfaces 704' and 705' and the current must travel across the length of the part which has increased resistivity because of its greater length.

FIG. 7B shows one improvement to the current SMD wherein the terminals are located along the wider edges. The push-pull device 706 comprises two SMDs that are shown as front SMD 708 and rear SMD 707. Note that the same labeling scheme is employed wherein the SIDE VIEW labels use the prime designations for corresponding parts. Electrode ledges 709 and 710 are now at the short sides of the parts. By placing the terminals along the wider edges, this design reduces the overall resistance lowers the effective series resistance of the cell.

$$Rb=Rs*L/W=Rs*Y/X \qquad (5)$$

where when X is greater than Y, Y/X is always less than 1. For X greater than Y, Ra is greater than Rb. In other words, to reduce the ITO resistance of the SMD, it is better to drive the cell from the wider edges, or apply the voltage across the narrow dimension.

FIG. 7C shows a specialized case where two adjacent edges of the cell form one terminal, while the remaining two edges for the other terminal. In this case, the resistance between the two terminals approaches zero at the two corners where the terminals nearly overlap. The maximum resistance occurs between the remaining two corners. The equation for FIG. 7B provides the upper limit for the resistance in the configuration of FIG. 7C. The push-pull ensemble is denoted by 711, and the "prime" designations are used for the two cross-sectional views to explain the assembly of the parts, namely the TOP VIEW and SIDE VIEWs to the right of the perspective view of FIG. 7C. Front SMD 713 and rear SMD 712 have corresponding electrode ledges 715 and 714.

As the capacitance of the SMD is charged and discharged, the non-uniform resistance of the ITO leads to different rates of charge/discharge of the capacitor over the area of the SMD. Correspondingly, the electric field in the capacitor is non-uniform. However, as the capacitance is fully charged/discharged, the SMD reaches equilibrium where the electric field is uniform throughout the device.

Transmission Enhancements

Anti-reflection (A/R or AR) coating approaches may also be employed. The cell design inherently has a number of optical interfaces. At each interface, potential damage can be caused to the signal through reflections. Reflections damage the system or hinder performance in two ways. First, they reduce the amount of light that is transmitted through the system. Second, they can add a birefringent effect and alter the characteristics of the circular polarization outputted by the push-pull device, resulting in contamination and cross talk between the left and right eyes. Anti-reflective coating can address these issues.

Previous designs did not use A/R coating, nor were the principal cell elements optically matched or bonded. This resulted in significant transmission losses. The present design uses optically index matched bonding compounds, typically epoxy, to provide improved transmission.

ITO conductive films used as electrodes for the liquid crystal are not completely transparent. As part of the pi cell structure 402 these films absorb or reflect some of the incident light. Reflection also occurs at the optical interface between the ITO and glass substrate, and at the ITO and LC interface. The index of refraction of glass is usually given at 1.5 nominally, while the ITO index value is given as between 1.8 and 2.1. This interface will undergo significant reflections with resulting inefficiency and, in addition, some polarization rotation. Index matching layers can be added to the ITO to minimize reflections and polarization artifacts at the interface and also improve transmission.

Transmission can also be improved by using thinner ITO, such as ITO having sheet resistivity of around 300 ohms per square. Such an ITO increases the series resistance of the cell and the need to make electrical contacts that are more efficient as described herein with reference to FIGS. 7B and 7C. A number of additional internal optical interfaces can have their optical interfaces improved. Glass has an index of refraction of approximately 1.5, while air is 1.0, and plastic films used for polarizer materials may have index of refraction values of between 1.4 and 1.6. These interfaces can be index matched either by providing conventional anti-reflection coatings or by eliminating any air gap by using a bonding compound with an index of close to 1.5 to minimize the mismatch.

The material chosen for the glass substrate 401 in FIGS. 4A and 4B for the cell structure has an impact on the overall quality and performance of the cell. A standard glass used in LC manufacturing, such as water clear Borofloat, is very good and provides high transmission and low coloration. The glass is sufficiently flat over the entire part's surface to eliminate significant wavefront distortion. Not using such materials can lead to a lack of clarity of the final projected image in which portions of the image may be distorted or have reduced focus.

Polarizer materials generally trade off polarization efficiency for transmission. An absorption sheet polarizer typically cannot transmit more than 50 percent of the incident light, and figures in the range of 32 to 42 percent are more common with adequate extinction characteristics. For a ZScreen application, the polarizer is typically able to withstand high luminous flux, such as on the order of 1,000,000 lux. Conventional iodine polarizers tend to overheat and bleach under this flux. Dyestuff polarizer materials may therefore be employed in order to withstand higher temperatures without significant damage. Other materials may be employed that provide the beneficial aspects disclosed herein.

The polarizer material provides adequate polarization efficiency while maximizing transmission. Previous polarizers had transmission of about 38 percent and efficiency of 99.9 percent. Dyestuff polarizers will provide transmission of about 41 per cent and efficiency of 99.95 percent, providing better performance for both transmission and efficiency while maintaining more stable performance at higher temperatures.

Blanking or the interval between fields is preferably kept to a minimum. The 3D modulation technique previously described projects alternate left and right eye images in an interleaved triple flash sequence. The ZScreen takes a finite time to switch from one polarization state to another. During this switching time, the transitional polarization state is contaminated (compared with the final state), and an image projected at this time contains polarization states that would be seen by both left and right eyes, which is undesirable, so minimum blanking or time intervals are beneficial.

Switching time of these types of devices has been specified as "10% to 90%", meaning that the time specified is the time required to switch from 10% to 90%. The first 10% and last 10% of switching time are thus undefined. Typically in liquid crystal electro-optical devices, the switching waveform is a stretched into what is termed an "s-shape", which has long tails—in particular in the last 10% or settling time of the waveform. During this settling time, significant light energy of an incomplete polarization state can contribute to crosstalk. For stereoscopic applications, the switching time is measured from 0% to 99% and from 100% to 1% to more accurately represent the switching time value.

To avoid having the image displayed during the switching interval, the image is blanked, or set to a blank image, during the switching time. The blanking time impacts the brightness of the screen, in that the longer the blanking time (as a proportion to the total frame time), the less intense the image. The present design employs relatively fast switching as compared against previously used designs.

Previous designs exhibit a switching time of approximately 2 milliseconds (100% to 1%). Improvements in drive circuits (using the quenching pulse waveform as described above) and reducing the liquid crystal gap thickness can result in a switching time of less than 600 microseconds. The liquid crystal material used to fill the cell is usually a mixture of several kinds of materials blended to create the best possible trade offs in terms of performance. Enhancements to the speed of the push-pull device result from these improvements.

A circular polarized system has circularly polarized light that exits the ZScreen, circularly polarized for one wavelength and elliptically polarized for all other wavelengths in the visible spectrum. For efficient modulation, the analyzers (glasses) of the circular polarized system are an inverse of the polarizer. The analyzers analyze circular polarization at the wavelength that the polarizer creates circular, and analyze the correct degree of ellipticity everywhere else.

To achieve the high quality viewing characteristics, the wavelength for circular polarization states matches the ZScreen and the viewer's glasses. Retardances at other wavelengths are preferably a close match, and the efficiency of linear polarization is preferably high. The effect of retardance mismatch in these elements is that light leaks through the polarizers when in a crossed state. Leakage is usually higher in red and blue. The wavelength of circular polarization is relatively low in the visible spectrum, in the present arrangement approximately 525 nm. Such a wavelength visually balances the leakage of red and blue to minimize the visual effect, and provide as neutral a color for the resulting leakage as possible.

Thermal/Flux Management

The ZScreen design taught herein can withstand a high level of luminous energy from the projector. The projector provides upwards of 25000 lumens, and future projectors may provide more luminous energy. 25000 lumens is approximately 60 watts of radiant power. Approximately 36 watts are dissipated on the ZScreen as a result of absorption in the glass and the linear polarizer. This results in a rise in temperature, with potential damaging effects to the polarizer. This much power may take the liquid crystal to an isotropic phase, where the liquid crystal fails to provide any modulation.

The present design addresses these issues by increasing the active area of the ZScreen by a factor of more than double, to providing a larger area for dissipating the heat, (fewer watts per square inch) and by providing a cooling fan to circulate cool air across the polarizer surface.

The cinema system, using a projector such as DLP Cinema™ from Texas Instruments provides accurate color calibration in the projector so that every theatre has the same color balance. The calibration is usually performed by measuring the color characteristics of the system. The system projects through the port glass as usual and the user/viewer observes the image, reflected off the theatre screen, through the 3-D glasses. Color correction in the system makes the correct shade of white and each of the RGB primary colors when seen by the eye. Calibration involves turning down the luminance of one or more of the RGB channels within the projector, resulting in lower light output. System efficiency can be maximized if the impact of all system components combined results in a relatively small amount of correction in the projector. The present design uses the bluish color of the projection screen to balance out the yellow-green color imparted by the ZScreen in combination with the glasses worn by the user/viewer, resulting in minimal color correction required in the projector and maximizing light output.

The result of the presently disclosed improvements to the push-pull electro-optical ZScreen modulator and the stereoscopic projection system has been to substantially improve the image quality of stereoscopic movies in theatrical cinemas. These stereoscopic motion pictures have superior left and right channel isolation and are clearer and brighter than previous designs.

In general, the present design results in a faster switching speed, enhanced transmission qualities, better extinction ratios, and enhanced thermal and flux management. Faster switching speeds are attained by using the enhanced drive scheme, enhancing the LC material and reducing the gap, and changing the connection to reduce series resistance, resulting in a switching speed decrease of approximately 33 percent in certain applications. Transmission may be improved on the order of 33 percent in some instances by using the AR coating described, ITO index match, bonding air to material components, using clearer/flatter glass, using a less dense polarizer, and reducing projector blanking time. The extinction ratio can be improved from the 60:1 rate seen previously to on the order of 250:1 using the enhanced LC material, matching the eyewear polarizer to the ZScreen, using AR coating and bonding air to material components. Thermal and flux management may be achieved using dyestuff polarizer, increasing area, and employing a cooling fan. Use of each of these improvements can increase viewing experiences significantly, while employing all of these improvements collectively can provide a highly superior design.

The design presented herein and the specific aspects illustrated are meant not to be limiting, but may include alternate components while still incorporating the teachings and benefits of the invention, namely the improved push-pull electro-optical ZScreen modulator and the stereoscopic projection system. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method of displaying a stereoscopic video image, comprising:

positioning a push-pull liquid crystal modulator that includes a pair of surface mode liquid crystal cells with orthogonal rub axes and a linear polarizer having an absorption axis bisecting the orthogonal rub axes, so that light comprising the stereoscopic video image propagates therethrough; and driving the modulator in synchronization with fields of a field sequential image so that a transmitted image emerging from the modulator consists of right-handed circularly polarized fields alternating at field rate with left-handed circularly polarized fields;

wherein said driving comprises moving an electrical charge using a waveform comprising at least one quenching pulse in association with a holding voltage comprising a relatively brief voltage spike opposite in polarity to the holding voltage and lower in absolute voltage than the holding voltage at a beginning of a holding voltage period.

2. The method of claim 1, further comprising positioning a left-handed circular polarizer analyzer and a right-handed circular polarizer analyzer so that circularly polarized light emerging from the modulator propagates through space and is reflected by a polarizing conserving screen through space and then through one circular polarizer analyzer while being blocked by a complementary circular polarizer analyzer.

3. The method of claim 1, wherein the modulator comprises a first surface mode liquid crystal cell and a second surface mode liquid crystal cell, and wherein the first cell is driven by a first voltage signal that alternates at field rate between a low voltage square wave and a high voltage square wave, and the second cell is driven by a second voltage signal having substantially the same amplitude as the first voltage signal but having phase opposite to the first signal's phase.

4. The method of claim 1, wherein each field includes at least two subfields, each subfield having a duration, the modulator includes a first surface mode liquid crystal cell and a second surface mode liquid crystal cell, and including:
driving the first cell with a first voltage signal; and driving the second cell with a second voltage signal, in such a manner that the absolute magnitude of the envelope of the first voltage signal and the absolute magnitude of the envelope of the second voltage signal decrease substantially simultaneously during each subfield.

5. The system of claim 1, wherein each field includes at least two subfields, and each subfield having a duration, the modulator includes a first surface mode liquid crystal cell and a second surface mode liquid crystal cell, and comprising:
driving the first cell with a first carrier-less voltage signal; and
driving the second cell with a second carrier-less voltage signal, in such a manner that the absolute magnitude of the first voltage signal and the absolute magnitude of the second voltage signal decrease substantially simultaneously during each subfield.

6. The method of claim 1, wherein the modulator includes a first surface mode liquid crystal cell and a second surface mode liquid crystal cell, and wherein the first cell is driven by a first voltage signal that alternates at field rate between a low AC voltage portion and a high AC voltage portion, and the second cell is driven by a second voltage signal having substantially the same amplitude as the first voltage signal but having phase opposite to the first signal's phase.

7. The method of claim 6, wherein each of the AC voltage portions is a 2 KHz sinusoidal wave, the low AC voltage portion has peak to peak amplitude in the range from zero volts to ten volts, and the high AC voltage portion has peak to peak amplitude in the range from 40 volts to 80 volts.

8. The method of claim 1, wherein the push-pull liquid modulator comprises a dyestuff polarizer.

9. The method of claim 1, wherein the push-pull liquid crystal modulator has air to material surfaces bonded.

10. The method of claim 1, wherein liquid crystal used in the push-pull liquid crystal modulator comprises water clear Borofloat.

11. The method of claim 1, wherein the push-pull liquid crystal modulator is employed in connection with a screen, and persons viewing the screen employ eyewear comprising polarizing elements matched to the push-pull liquid crystal modulator.

12. A method of displaying a stereoscopic video image, comprising:
driving a push-pull liquid crystal modulator comprising:
a pair of surface mode liquid crystal cells with orthogonal rub axes; and
a linear polarizer having an absorption axis bisecting the orthogonal rub axes, the push-pull liquid crystal modulator positioned so that light comprising the stereoscopic video image propagates therethrough;
wherein said driving occurs in synchronization with fields of a field sequential image so that a transmitted image emerging from the modulator comprises right-handed circularly polarized fields alternating at field rate with left-handed circularly polarized fields;
and further wherein said driving comprises moving an electrical charge using a waveform comprising at least one quenching pulse in association with a holding voltage comprising a relatively brief voltage spike opposite in polarity to the holding voltage and lower in absolute voltage than the holding voltage at a beginning of a holding voltage period.

13. The method of claim 12, further comprising positioning a left-handed circular polarizer analyzer and a right-handed circular polarizer analyzer so that circularly polarized light emerging from the modulator propagates through space and is reflected by a polarizing conserving screen through space and then through one circular polarizer analyzer while being blocked by a complementary circular polarizer analyzer.

14. The method of claim 12, wherein the modulator comprises a first surface mode liquid crystal cell and a second surface mode liquid crystal cell, and wherein the first cell is driven by a first voltage signal that alternates at field rate between a low voltage square wave and a high voltage square wave, and the second cell is driven by a second voltage signal having substantially the same amplitude as the first voltage signal but having phase opposite to the first signal's phase.

15. The method of claim 12, wherein each field includes at least two subfields, each subfield having a duration, the modulator includes a first surface mode liquid crystal cell and a second surface mode liquid crystal cell, and including:
driving the first cell with a first voltage signal; and
driving the second cell with a second voltage signal, in such a manner that the absolute magnitude of the envelope of the first voltage signal and the absolute magnitude of the envelope of the second voltage signal decrease substantially simultaneously during each subfield.

16. The system of claim 12, wherein each field includes at least two subfields, and each subfield having a duration, the modulator includes a first surface mode liquid crystal cell and a second surface mode liquid crystal cell, and comprising:
driving the first cell with a first carrier-less voltage signal; and
driving the second cell with a second carrier-less voltage signal, in such a manner that the absolute magnitude of the first voltage signal and the absolute magnitude of the second voltage signal decrease substantially simultaneously during each subfield.

17. The method of claim 12, wherein the modulator includes a first surface mode liquid crystal cell and a second surface mode liquid crystal cell, and wherein the first cell is driven by a first voltage signal that alternates at field rate between a low AC voltage portion and a high AC voltage portion, and the second cell is driven by a second voltage signal having substantially the same amplitude as the first voltage signal but having phase opposite to the first signal's phase.

18. The method of claim 17, wherein each of the AC voltage portions is a 2 KHz sinusoidal wave, the low AC voltage portion has peak to peak amplitude in the range from zero volts to ten volts, and the high AC voltage portion has peak to peak amplitude in the range from 40 volts to 80 volts.

19. The method of claim 12, wherein the push-pull liquid modulator comprises a dyestuff polarizer.

20. The method of claim 12, wherein the push-pull liquid crystal modulator has air to material surfaces bonded.

21. The method of claim 12, wherein liquid crystal used in the push-pull liquid crystal modulator comprises water clear Borofloat.

22. The method of claim 12, wherein the push-pull liquid crystal modulator is employed in connection with a screen, and persons viewing the screen employ eyewear comprising polarizing elements matched to the push-pull liquid crystal modulator.

23. A stereoscopic video image display system, comprising:
a push-pull liquid crystal modulator comprising:
a pair of surface mode liquid crystal cells with orthogonal rub axes; and a linear polarizer having an absorption axis bisecting the orthogonal rub axes, the push-pull liquid crystal modulator positioned so that a stereoscopic image propagates therethrough;

wherein said push-pull liquid crystal modulator is driven in synchronization with fields of a field sequential image so that a transmitted image emerging from the modulator comprises right-handed circularly polarized fields alternating at field rate with left-handed circularly polarized fields;

and further wherein said push-pull liquid crystal modulator is driven by moving an electrical charge using a waveform comprising at least one quenching pulse in association with a holding voltage comprising a relatively brief voltage spike opposite in polarity to the holding voltage and lower in absolute voltage than the holding voltage at a beginning of a holding voltage period.

24. The system of claim 23, wherein the modulator comprises a first surface mode liquid crystal cell and a second surface mode liquid crystal cell, and wherein the first cell is driven by a first voltage signal that alternates at field rate between a low voltage square wave and a high voltage square wave, and the second cell is driven by a second voltage signal having substantially the same amplitude as the first voltage signal but having phase opposite to the first signal's phase.

25. The system of claim 23, wherein the modulator includes a first surface mode liquid crystal cell and a second surface mode liquid crystal cell, and wherein the first cell is driven by a first voltage signal that alternates at field rate between a low AC voltage portion and a high AC voltage portion, and the second cell is driven by a second voltage signal having substantially the same amplitude as the first voltage signal but having phase opposite to the first signal's phase.

* * * * *